July 16, 1968  R. MALITTE  3,392,954
SLIDABLE SEATS
Original Filed April 30, 1964  2 Sheets-Sheet 1
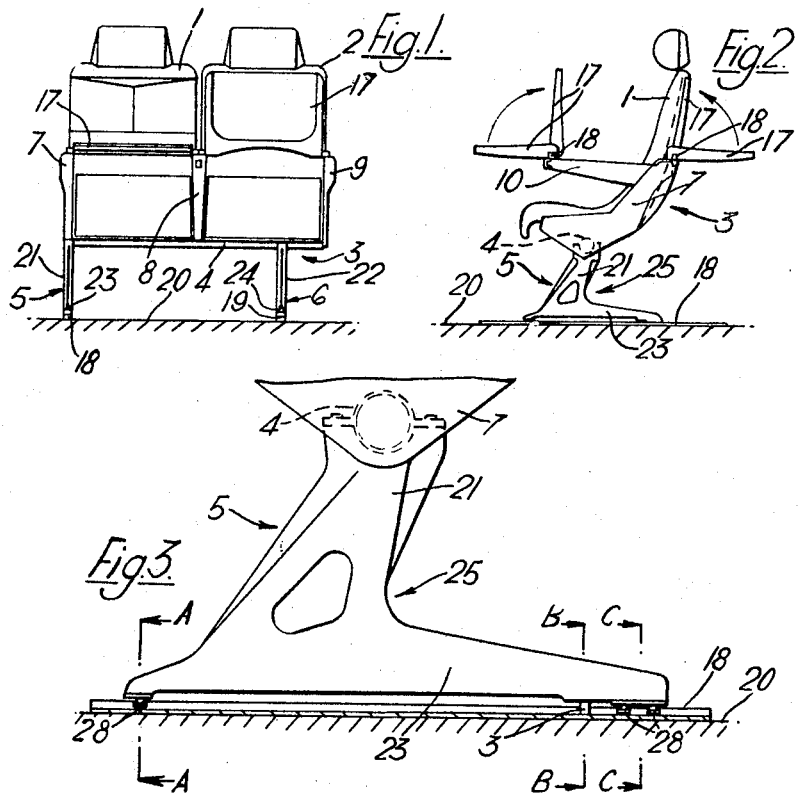
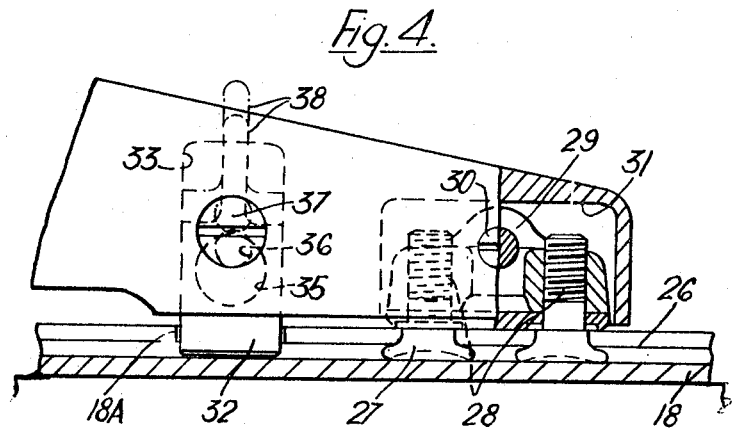
Inventor
ROBERT MALITTE
By Young + Thompson
Attorneys July 16, 1968  R. MALITTE  3,392,954
SLIDABLE SEATS
Original Filed April 30, 1964  2 Sheets-Sheet 2
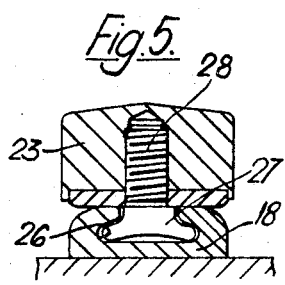
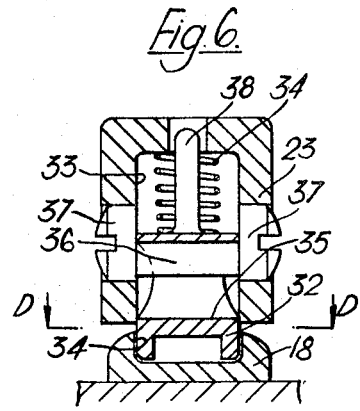
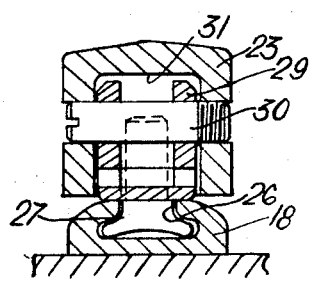
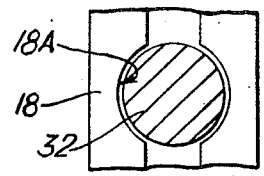
Inventor
ROBERT MALITTE
By Young + Thompson
Attorneys ered July 16, 1968

3,392,954
SLIDABLE SEATS
Robert Malitte, Orly, France, assignor to Compagnie Nationale Air France, Paris, France, a French company
Original application Apr. 30, 1964, Ser. No. 363,925, now Patent No. 3,284,134, dated Nov. 8, 1966. Divided and this application Mar. 24, 1966, Ser. No. 537,152
3 Claims. (Cl. 248—429)

ABSTRACT OF THE DISCLOSURE

A seat of a plurality of seats which are arrangeable one behind the other in which are provided body-receiving means and a framework supporting the means and including a plurality of legs each leg consisting of a pair of laterally spaced leg frames of generally L-shape with the upright limbs disposed below the body receiving means and the horizontal limbs extending rearwards from the bottom of the upright limbs to define with the upright limbs rearwardly facing V-gaps and so minimize obstruction in the inter seat space, front and rear heads of inverted-T section projecting from the bottoms of the leg frames and a pair of these heads being carried by respective arms of a lever which upon locking facilitates sliding movement of these heads.

---

This application is a divisional application of application Ser. No. 363,925, filed Apr. 30, 1964, now Patent No. 3,284,134.

This invention relates to seats which are arrangeable one behind the other as for example, in public halls and aircraft, each seat having body-receiving means and a framework supporting said means.

An object of the invention is to provide in the aforesaid seat a supporting framework which minimizes obstruction in the inter-seat space.

Another object of the invention is to provide an improved rail mounting facilitating adjustment of the seat along the supporting floor.

Yet another object of the invention is to provide a visual indication that the seat is securely locked in adjusted position.

An embodiment of the invention will now be described by way of example with reference to the accompanying drawings in which:

FIG. 1 is a side view of a duplex seating unit, several of said units being arrangeable in a row one behind the other, e.g., in public halls and vehicles;

FIG. 2 is a rear view of the unit of FIG. 1;

FIG. 3 is an enlarged side view of the lower portion of the unit of FIG. 1;

FIG. 4 is an enlarged side view of the rear end portion of FIG. 3;

FIGS. 5 to 7 are respectively sectional views on the lines A—A, B—B and C—C of FIG. 3; and FIG. 8 is a sectional top plan view on the line D—D of FIG. 6.

Referring to the drawings:

A duplex seating unit consists of a pair of side-by-side body receiving portions 1 and 2 individually mounted on a framework 3. The framework 3 includes a transversely extending circular-section tubular base frame 4, a pair of legs 5 and 6 at opposite ends of the base frame, and three L-shaped side frames 7, 8 and 9 upstanding from the base frame and carrying the body-receiving portions 1 and 2. Three arm rests 10, 11 and 12 project from the upstanding limbs of the side frames. Trays 17 are transferable from locations on the fronts of the arm rests 10–12 to locations on the side frames 7–9, and are hingeable between horizontal in-use position and upright stoved position in either location of the tray.

The legs 5 and 6 consist of frames of generally L-shape, and are mounted for sliding adjustment along a pair of parallel rails 18 and 19 on the floor 20. The upright limbs 21 and 22 of the leg frames are connected at their upper ends to the tube 4, as shown in FIG. 3; and the horizontal limbs 23 and 24 extend rearwards from the lower ends of the upright limbs to define with the upright limbs rearwardly facing V-gaps 25 and so minimize obstruction in the inter-seat space. Each of the leg frames 5 and 6 may be formed as a unit of cast or stamped light alloy, or of strong, drawn metal plate or of welded or brazed tubes. The deep gaps 25 allow the user in the seat immediately behind to stretch out and move his legs without the risk of getting a knock or being caught, as in the case of the vertical or almost vertical legs of the usual seats.

Each rail 18, 19 presents a longitudinal slot 26 of inverted-T section slidingly engaged by the inverted-T section heads 27 of screw-threaded pins 28 mounted on the horizontal limb 23 at the front and rear ends of the limb. There is a single pin 28 at the front end of the limb 23 and a pair of pins 28 at the rear end of the limb, the rear pair being secured to the respective arms of an equi-armed lever 29 which rocks on a transverse pivot pin 30 in a recess 31 in the limb to facilitate sliding movement of the heads 27 on the rail.

Locking means, with an indicator, are provided on each limb 23 adjacent to the rear pair of pins 28, and include a cylindrical bolt 32 vertically reciprocable in a stepped through-bore 33 in the limb 23, and a circular recess 18A in the rail 18 engageable by the bolt 32 to lock the limb against sliding movement on the rail. Actuating means for the bolt 32 consist of a spring 34 located in the bore 33 and urging the bolt downwards, a transverse bore 35 in the bolt, and an eccentric 36 rotatably mounted on the limb 33 by means of slotted heads 37, the slots of the heads enabling rotation of the eccentric 36 by means of a screw-driver, a key or simply a coin. The eccentric 36 engages the wall of the bore 35 to raise the bolt against spring action and permit lowering of the bolt under spring action. An upward extension 38 on the bolt projects from the top face of the limb 23 when the bolt is in withdrawn position and is hidden within the bore 33 when the bolt is in lowered position, and so serves to indicate the position of the bolt.

I claim:
1. A seat of a plurality of seals which are arrangeable one behind the other, said seat comprising: body-receiving means and a framework supporting said means and including a plurality of legs; said legs comprising a pair of laterally spaced leg frames of generally L-shape having upright limbs disposed below the body-receiving means and horizontal limbs extending rearwards from the bottom of said upright limbs to define with said upright limbs rearwardly facing V-gaps; said leg frames having bottoms; a rail mounting comprising a pair of parallel rails having a pair of parallel longitudinal slots of inverted-T section, front and rear heads of inverted-T section projecting from the bottoms of the leg frames and slidingly engaging in said slots, vertically reciprocable bolts on said leg frames, actuating means for the bolts, recesses in the rails engageable by said bolts so that said leg frames are locked against sliding movement upon lowering the bolts into said recesses; each leg frame having at one end thereof, a two-armed lever mounted thereon for rocking movement about a transverse axis, a pair of said heads being carried by the respective arms of said lever to facilitate sliding movement of said heads on the rail upon rocking of said lever.

2. The seat according to claim 1, wherein each bolt is vertically slideable in a vertical bore in its leg frame, and said actuating means consist of a spring in the bore urging the bolt to lowered position, a transverse bore in the bolt, a rotary eccentrically mounted in said leg frame and engageable with the wall of the transverse bore to raise the bolt against spring action and permit lowering of the bolt under spring action.

3. The seat according to claim 2, wherein said vertical bore in said leg frame is a through bore, and said bolt has an upward extension which projects from the top of said leg frame when said bolt is in withdrawn position and is hidden within the bore when the bolt is in lowered position and so serves to indicate the position of said bolt.

References Cited

UNITED STATES PATENTS 3,134,627  5/1964  Mason _____ 297—248 XR

FOREIGN PATENTS 401,196  11/1933  Great Britain.
424,686  8/1947  Italy.

ROY D. FRAZIER, *Primary Examiner.*

J. F. FOSS, *Assistant Examiner.*